US012562401B2

(12) United States Patent
Yang et al.

(10) Patent No.: US 12,562,401 B2
(45) Date of Patent: Feb. 24, 2026

(54) JELLY-ROLL BATTERY CELL AND ELECTROCHEMICAL DEVICE

(71) Applicant: Ningde Amperex Technology Limited, Fujian (CN)

(72) Inventors: Dian Yang, Dongguan (CN); Congfei Yan, Dongguan (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 988 days.

(21) Appl. No.: 17/708,952

(22) Filed: Mar. 30, 2022

(65) Prior Publication Data

US 2022/0223922 A1     Jul. 14, 2022

Related U.S. Application Data

(63) Continuation of application No. PCT/CN2020/079038, filed on Mar. 12, 2020.

(51) Int. Cl.
*H01M 10/0587* (2010.01)
*H01M 50/531* (2021.01)

(52) U.S. Cl.
CPC ..... *H01M 10/0587* (2013.01); *H01M 50/531* (2021.01)

(58) Field of Classification Search
CPC ...................... H01M 10/0587; H01M 50/531
See application file for complete search history.

(56) References Cited

U.S. PATENT DOCUMENTS

| | | |
|---|---|---|
| 2012/0237811 A1 | 9/2012 | Xia et al. |
| 2018/0034109 A1 | 2/2018 | Wang et al. |
| 2018/0083319 A1* | 3/2018 | Xiao ................. H01M 10/0459 |
| 2020/0044274 A1 | 2/2020 | He et al. |

FOREIGN PATENT DOCUMENTS

| | | |
|---|---|---|
| CN | 102157752 A | 8/2011 |
| CN | 205508964 U | 8/2016 |
| CN | 106025377 A | 10/2016 |
| CN | 205828556 U | 12/2016 |
| CN | 205828578 U | 12/2016 |
| CN | 206697567 U | 12/2017 |
| CN | 208444906 U | 1/2019 |
| CN | 110808377 A | 2/2020 |

OTHER PUBLICATIONS

Office Action dated Sep. 5, 2022, issued in counterpart CN Application No. 202080005204.8. (8 pages).
International Search Report dated Oct. 30, 2020, issued in counterpart application No. PCT/CN2020/079038, w/ English translation (8 pages).

* cited by examiner

*Primary Examiner* — Olatunji A Godo
(74) *Attorney, Agent, or Firm* — WHDA, LLP

(57) ABSTRACT

A jelly-roll battery cell includes a first electrode plate, a second electrode plate, and a separator, and includes a central region enclosed by the first electrode plate, the second electrode plate, and the separator, and has a thickness direction. The first electrode plate includes: a first current collector, where the first current collector includes a first surface and a second surface opposite to the first surface, and the first surface is closer to the central region than the second surface; a first section; and a second section, where a first tab is disposed on the first surface in the second section. The second electrode plate includes a second tab whose first side is on the second electrode plate. The first end, the first tab, and the second tab do not overlap in a thickness direction.

20 Claims, 8 Drawing Sheets

JELLY-ROLL BATTERY CELL AND ELECTROCHEMICAL DEVICE

CROSS-REFERENCE TO RELATED APPLICATIONS

This application is a national phase entry of International Application No. PCT/CN2020/079038, filed on Mar. 12, 2020 and entitled "JELLY-ROLL BATTERY CELL AND ELECTROCHEMICAL DEVICE", which is incorporated herein by reference in its entirety.

TECHNICAL FIELD

This application relates to the field of batteries, and in particular, to a jelly-roll battery cell and an electrochemical device.

BACKGROUND

Batteries have been widely used in various fields such as electronic products and electric vehicles. However, higher requirements are imposed on an energy density of the batteries in the market when the batteries are more commercialized. Therefore, a jelly-roll battery cell and an electrochemical device that have a relatively high energy density are required in the industry.

SUMMARY

One of the objectives of the embodiments of this application is to provide a jelly-roll battery cell and an electrochemical device to reduce a thickness of the jelly-roll battery cell and achieve a relatively high energy density and a relatively high space utilization rate.

According to an embodiment of this application, a jelly-roll battery cell is provided, including a first electrode plate, a second electrode plate, and a separator. The separator is disposed between the first electrode plate and the second electrode plate. The first electrode plate, the second electrode plate, and the separator are wound to form the jelly-roll battery cell. The jelly-roll battery cell has a thickness direction and a central region that is enclosed by the first electrode plate, the second electrode plate, and the separator. The first electrode plate includes: a first current collector, where the first current collector includes a first surface and a second surface opposite to the first surface, and the first surface is closer to the central region than the second surface. The first current collector comprises a first section and a second section, the first section has a first end and a second end, and the first end is a winding initiation end of the first electrode plate; the second section has a third end and a fourth end, the third end is connected to the second end, the second section is flat, and a first tab is disposed on the first surface in the second section. The second electrode plate includes: a second tab, where the second tab has a first side and a second side opposite to the first side. The first side is on the second electrode plate. The first end, the first tab, and the second tab do not overlap in the thickness direction.

In some embodiments of this application, the separator has a fifth end and a sixth end. The fifth end is a winding initiation end of the separator. The sixth end is a winding termination end of the separator. The fifth end does not overlap the first end, the first tab, or the second tab in the thickness direction.

In some embodiments of this application, the sixth end does not overlap the first tab or the second tab in the thickness direction.

In some embodiments of this application, the separator has a first boundary line. A part from the first boundary line to the fifth end constitutes a first part of the separator. A shape of the first part is curved or flat. The first part does not overlap the first tab or the second tab in the thickness direction.

In some embodiments of this application, the jelly-roll battery cell further includes a first insulation adhesive. The first insulation adhesive overlays a winding termination end of the second electrode plate, and the first insulation adhesive does not overlap the first tab or the second tab in the thickness direction.

In some embodiments of this application, the winding termination end of the second electrode plate does not overlap the first tab or the second tab in the thickness direction.

In some embodiments of this application, no first active material layer is disposed on the first surface or the second surface in the first section, no first active material layer is disposed on the first surface in the second section, and the first active material layer is disposed on the second surface in the second section.

In some embodiments of this application, the first current collector further includes a third section and a fourth section. The third section has a seventh end and an eighth end. The seventh end is connected to the fourth end. The fourth section has a ninth end and a tenth end. The ninth end is connected to the eighth end. The tenth end is a winding termination end of the first electrode plate. No first active material layer is disposed on the first surface in the third section, and the first active material layer is disposed on the second surface in the third section, and the first active material layer is disposed on the first surface and the second surface in the fourth section.

In some embodiments of this application, the separator located between the second section and the third section is provided with a coating or not provided with a coating.

In some embodiments of this application, the second electrode plate includes a second current collector. The second current collector includes a third surface and a fourth surface opposite to the third surface. The third surface is closer to the central region than the fourth surface. The second current collector further includes a fifth section, a sixth section, and a seventh section. The fifth section has an eleventh end and a twelfth end. The eleventh end is a winding initiation end of the second electrode plate. The sixth section has a thirteenth end and a fourteenth end. The thirteenth end is connected to the twelfth end. The seventh section has a fifteenth end and a sixteenth end. The fifteenth end is connected to the fourteenth end. The sixteenth end is a winding termination end of the second electrode plate. A second active material layer is disposed on the third surface and the fourth surface in the fifth section. The second active material layer is disposed on the third surface in the sixth section. No second active material layer is disposed on the third surface or the fourth surface in the seventh section.

In some embodiments of this application, the fifth section includes a first subsection, a second subsection, a third subsection, a fourth subsection, and a fifth subsection. The first subsection, the third subsection, and the fifth subsection are flat. The second subsection and the fourth subsection are curved. The first subsection is a starting subsection of the fifth section. The second subsection is connected to the first subsection. The third subsection is connected to the second subsection. The fourth subsection is connected to the third subsection. The fifth subsection is an ending subsection of the fifth section. The sixth section includes a sixth subsection, a seventh subsection, an eighth subsection, and a ninth subsection. The sixth subsection and the eighth subsection are curved. The seventh subsection and the ninth subsection are flat. The sixth subsection is a starting subsection of the sixth section. The seventh subsection is connected to the sixth subsection. The eighth subsection is connected to the seventh subsection. The ninth subsection is connected to the eighth subsection. The ninth subsection is an ending subsection of the sixth section. The seventh section includes a tenth subsection and an eleventh subsection. The tenth subsection is curved, and the eleventh subsection is flat. The tenth subsection is a starting subsection of the seventh section, and the eleventh subsection is an ending subsection of the seventh section. A second insulation adhesive is disposed on the fourth surface in the sixth subsection. An initiation end and a termination end of the second insulation adhesive overlap an initiation end and a termination end of the sixth subsection respectively. The initiation end of the sixth subsection is connected to the fifth section. A third insulation adhesive is disposed on the third surface in the tenth subsection. An initiation end and a termination end of the third insulation adhesive overlap an initiation end and a termination end of the tenth subsection respectively. The initiation end of the tenth subsection is connected to the sixth section.

In some embodiments of this application, the sixth end extends beyond the termination ends of the second insulation adhesive and the third insulation adhesive, or the sixth end is flush with the termination ends of the second insulation adhesive and the third insulation adhesive.

In some embodiments of this application, the first side of the second tab is on the third surface in the eleventh subsection.

In some embodiments of this application, the first side of the second tab is on the fourth surface in the seventh subsection.

In some embodiments of this application, the jelly-roll battery cell further includes a fourth insulation adhesive overlaying the second side of the second tab.

In some embodiments of this application, a first insulation adhesive overlays the second side of the second tab.

In some embodiments of this application, the second tab is located below the eleventh subsection.

In some embodiments of this application, the third subsection has a first part, no second active material layer is disposed on the third surface or the fourth surface in the first part, and the first side of the second tab is on either the third surface or the fourth surface in the first part. Alternatively, the fifth subsection has a second part, no second active material layer is disposed on the third surface or the fourth surface in the second part, and the first side of the second tab is on either the third surface or the fourth surface in the second part; and the jelly-roll battery cell further includes: a fifth insulation adhesive, disposed on the second side of the second tab, and shielding a corresponding surface in the first part or the second part, where the surface is connected to the second side of the second tab; and a sixth insulation adhesive, disposed opposite to the fifth insulation adhesive, and shielding a surface in the first part or a surface in the second part, in each case the surface being not connected to the first side of the second tab.

In some embodiments of this application, the jelly-roll battery cell further includes a seventh insulation layer disposed at a corresponding position on the first electrode plate, the position being opposite to the fifth insulation adhesive and the sixth insulation adhesive.

According to another embodiment of this application, an electrochemical device is provided, including the jelly-roll battery cell disclosed in any of the foregoing embodiments.

The jelly-roll battery cell and the electrochemical device according to the embodiments of this application achieve a smaller thickness, a higher energy density, and a higher space utilization rate than conventional jelly-roll battery cells.

BRIEF DESCRIPTION OF DRAWINGS

For ease of describing the embodiments of this application, the following outlines the drawings necessary for describing the embodiments of this application. Apparently, the drawings outlined below are merely a part of embodiments in this application. Without making any creative efforts, a person skilled in the art can still obtain the drawings of other embodiments according to the structures illustrated in these drawings.

DETAILED DESCRIPTION OF EMBODIMENTS

Figure 1A:
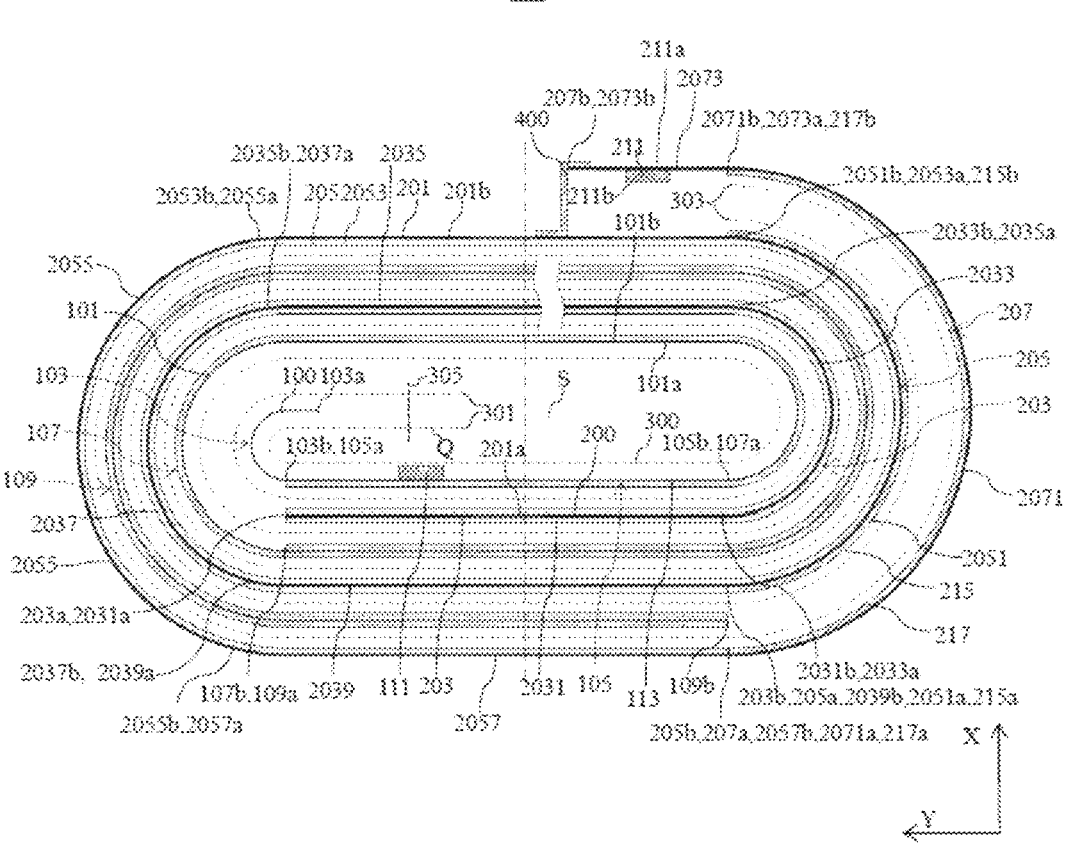
FIG. 1A is a cross-sectional schematic view of a jelly-roll battery cell according to an embodiment of this application.

Embodiments of this application will be described in detail below. Throughout the specification of this application, the same or similar components and the components having the same or similar functions are denoted by similar reference numerals. The embodiments described herein with reference to the accompanying drawings are illustrative and graphical in nature, and are intended to enable a basic understanding of this application. The embodiments of this application are not to be construed as a limitation on this application.

In this specification, unless otherwise specified or defined, relativity terms such as "central", "longitudinal", "lateral", "front", "rear", "right" ",", "left", "internal", "external", "lower", "higher", "horizontal", "perpendicular", "higher than", "lower than", "above", "under", "top", "bottom", and derivative terms thereof (such as "horizontally", "downwardly", "upwardly") shall be interpreted as a direction described in the context or a direction illustrated in the drawings. The relativity terms are used for ease of description only, and do not require that the construction or operation of this application should be in a specific direction.

The terms "about", "roughly", "substantially", "substantively", and "approximately" used herein are intended to describe and represent small differences. When used together an event or situation, such terms may represent an example in which the event or situation occurs exactly or an example in which the event or situation occurs very approximately. For example, when used together with a numerical value, such terms may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% of an average of the numerical values (such as ±5%, ±4%, ±3%, ±2%, ±1%, ±0.5%, ±0.1%, or ±0.05% of the average), the two numerical values may be considered "substantially" the same.

Furthermore, for ease of description, "first", "second", "third", and the like may be used herein to distinguish different components in one drawing or a series of drawings. "First", "second", "third", and the like are not intended to describe corresponding components.

In this application, unless otherwise expressly specified or defined, the terms "dispose", "connect", "couple", "fix", and similar terms are used in a broad sense, and a person skilled in the art understands that, depending on the context, such terms may mean, for example, fixedly connecting, detachably connecting, or integrally connecting; or mechanically connecting or electrically connecting; or directly connecting or indirectly connecting through an intermediary structure; or internal communication between two components.

In the description of specific embodiments and claims, a list of items referred to by using the terms such as "one of", "one thereof", "one type of" or other similar terms may mean any one of the listed items. For example, if items A and B are listed, the phrase "one of A and B" means A alone, or B alone. In another example, if items A, B, and C are listed, then the phrases "one of A, B, and C" and "one of A, B, or C" mean: A alone; B alone; or C alone. The item A may include a single element or a plurality of elements. The item B may include a single element or a plurality of elements. The item C may include a single element or a plurality of elements.

In the description of embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

When forming a jelly-roll battery cell in the prior art, a separator usually needs to be wound for an empty coil interiorly. Consequently, four layers of separators exist inside the jelly-roll battery cell. Therefore, a space utilization rate of the jelly-roll battery cell provided in the prior art is low. The interior of a battery cell structure and a separator winding technique may be improved to obtain a jelly-roll battery cell inside which only two layers of separators exist. However, high requirements on an energy density of the battery cell in the market are not fully satisfied by merely improving the space utilization rate of the battery cell by reducing the quantity of layers of separators inside the jelly-roll battery cell. Therefore, more technical solutions to effectively obtaining a jelly-roll battery cell with a higher energy density and a higher space utilization rate are required in the industry.

In view of the foregoing situation, embodiments of this application provide an improved jelly-roll battery cell and electrochemical device. In this application, only two layers of separators exist in a central region of the jelly-roll battery cell. In addition, by designing a positional relationship between the separator located in the central region of the jelly-roll battery cell and an electrode plate and/or a cell tab in the central region in a thickness direction of the battery cell, this application effectively reduces a thickness of the battery cell and thereby improves a space utilization rate and an energy density of the battery cell.

FIG. 1A is a cross-sectional schematic view of a jelly-roll battery cell 10I according to an embodiment of this application. As shown in FIG. 1A, the jelly-roll battery cell 10I according to an embodiment of this application includes a first electrode plate 100, a second electrode plate 200, and a separator 300. The first electrode plate 100, the second electrode plate 200, and the separator 300 are wound to form the jelly-roll battery cell 10I. The jelly-roll battery cell 10I has a thickness direction X, a length direction Y perpendicular to the thickness direction, and a central region S enclosed by the first electrode plate 100, the second electrode plate 200, and the separator 300.

The first electrode plate 100 may include a first current collector 101. A material of the first current collector 101 may include any material applicable to a current collector in the art. The first current collector 101 may include, for example, but without limitation, a polymer layer and/or a metal layer. The first current collector 101 may include a first surface 101a and a second surface 101b opposite to the first surface 101a. The first surface 101a is closer to the central region S than the second surface 101b.

The first current collector 101 may include a first section 103, a second section 105, a third section 107, and a fourth section 109. The first section 103, the second section 105, the third section 107, and the fourth section 109 each may be regarded as a part of the first current collector 101. The first section 103, the second section 105, the third section 107, and the fourth section 109 together constitute the entire first current collector 101.

The first section 103 has a first end 103a and a second end 103b. The first end 103a may be an initiation end of the first section 103, that is, a winding initiation end of the first electrode plate 100. The second end 103b may be a termination end of the first section 103. The first surface 101$a$ and the second surface 101$b$ in the first section 103 may be not provided with an active material layer. To be specific, a part of the first current collector 101, which is defined by the first section 103, may be a current collector that is not provided with an active material layer. The first section 103 may include a curved current collector and/or a flat current collector.

The second section 105 is connected to the first section 103. The second section 105 has a third end 105$a$ and a fourth end 105$b$. The third end 105$a$ may be an initiation end of the second section 105 and is connected to the second end 103$b$. The fourth end 105$b$ may be a termination end of the second section 105. The second section 105 may include merely a flat current collector. The first surface 101$a$ in the second section 105 may be provided with a first tab 111. A material of the first tab 111 may include a metal. In some embodiments, the material of the first tab 111 may include copper. In some embodiments, the material of the first tab 111 may include nickel. In some embodiments, the material of the first tab 111 may include an alloy material of nickel, silver, or copper. In some embodiments, the material of the first tab 111 may include any material applicable to a tab in the art. The first tab 111 may be connected to the first surface 101$a$ in the second section 105 of the first current collector 101 by any appropriate means such as, but without limitation, resistance welding, ultrasonic welding, and conductive adhesive connection. The first tab 111 may be a negative tab. In other embodiments of this application, the first tab 111 may be a positive tab. When the first tab 111 is located in the second section 105 of the first electrode plate 100, the separator 300 at the winding initiation end does not need to be wound for an empty coil. Therefore, the central region S may be provided with only two layers of separators 300. The first surface 101$a$ in the second section 105 may be not provided with an active material layer. The second surface 101$b$ in the second section 105 may be provided with a first active material layer 113. To be specific, a part of the first current collector 101, which is defined by the second section 105, may be a current collector of which only one surface is provided with the active material layer. The first active material layer 113 may include any material commonly used in the art as an active material layer, for example, but without limitation, silicon-carbon hybrid, conductive carbon black (Super P), styrene butadiene rubber (SBR) as a binder, or lithium cobalt oxide (LiCoO$_2$).

The third section 107 is connected to the second section 105. The third section 107 has a seventh end 107$a$ and an eighth end 107$b$. The seventh end 107$a$ may be an initiation end of the third section 107 and is connected to the fourth end 105$b$. The eighth end 107$b$ may be a termination end of the third section 107. The third section 107 may include curved and flat current collectors. The first surface 101$a$ in the third section 107 may be not provided with an active material layer. The second surface 101$b$ in the third section 107 may be provided with a first active material layer 113. To be specific, a part of the first current collector 101, which is defined by the third section 107, may be a current collector of which only one surface is provided with the active material layer.

The fourth section 109 is connected to the third section 107. The fourth section 109 has a ninth end 109$a$ and a tenth end 109$b$. The ninth end 109$a$ may be an initiation end of the fourth section 109 and is connected to the eighth end 107$b$. The tenth end 109$b$ may be a termination end of the fourth section 109, that is, a winding termination end of the first electrode plate 100. The fourth section 109 may include a curved current collector and a flat current collector. Both the first surface 101$a$ and a second surface 101$b$ in the fourth section 109 may be provided with the first active material layer 113. To be specific, a part of the first current collector 101, which is defined by the fourth section 109, may be a current collector of which both surfaces are provided with the active material layer.

The second electrode plate 200 may include a second current collector 201. A material of the second current collector 201 may include any material applicable to a current collector in the art. The second current collector 201 may include, for example, but without limitation, a polymer layer and/or a metal layer. The second current collector 201 may include a third surface 201$a$ and a fourth surface 201$b$ opposite to the third surface 201$a$. The third surface 201$a$ is closer to the central region S than the fourth surface 201$b$.

The second current collector 201 may include a fifth section 203, a sixth section 205, and a seventh section 207. The fifth section 203, the sixth section 205, and the seventh section 207 each may be regarded as a part of the second current collector 201. The fifth section 203, the sixth section 205, and the seventh section 207 together constitute the entire second current collector 201.

The fifth section 203 has an eleventh end 203$a$ and a twelfth end 203$b$. The eleventh end 203$a$ may be an initiation end of the fifth section 203, that is, a winding initiation end of the second electrode plate 200. The twelfth end 203$b$ may be a termination end of the fifth section 203. The third surface 201$a$ and the fourth surface 201$b$ in the fifth section 203 may be provided with a second active material layer 213. To be specific, a part of the second current collector 201, which is defined by the fifth section 203, may be a current collector of which both surfaces are provided with the active material layer. The second active material layer 213 may include any material commonly used in the art as an active material layer, for example, but without limitation, silicon-carbon hybrid, conductive carbon black (Super P), styrene butadiene rubber (SBR) as a binder, or lithium cobalt oxide (LiCoO$_2$). The material of the second active material layer 213 may be identical to or different from the material of the first active material layer 113. The fifth section 203 may include a curved current collector and/or a flat current collector.

The fifth section 203 may include a first subsection 2031, a second subsection 2033, a third subsection 2035, a fourth subsection 2037, and a fifth subsection 2039. The first subsection 2031, the second subsection 2033, the third subsection 2035, the fourth subsection 2037, and the fifth subsection 2039 each may be regarded as a part of the fifth section 203. The first subsection 2031, the second subsection 2033, the third subsection 2035, the fourth subsection 2037, and the fifth subsection 2039 together constitute the entire fifth section 203.

The first subsection 2031 may be a starting subsection of the fifth section 203. The first subsection 2031 has an initiation end 2031$a$ and a termination end 2031$b$. The initiation end 2031$a$ of the first subsection 2031 overlaps the eleventh end 203$a$ of the fifth section 203. The initiation end 2031$a$ is a winding initiation end of the second electrode plate 200. The first subsection 2031 may be flat. The second subsection 2033 is connected to the first subsection 2031. The second subsection 2033 has an initiation end 2033$a$ and a termination end 2033$b$. The initiation end 2033$a$ of the second subsection 2033 is connected to the termination end 2031$b$ of the first subsection 2031. The second subsection 2033 may be curved. The third subsection 2035 is connected to the second subsection 2033. The third subsection 2035 has an initiation end 2035*a* and a termination end 2035*b*. The initiation end 2035*a* of the third subsection 2035 is connected to the termination end 2033*b* of the second subsection 2033. The third subsection 2035 may be flat. The fourth subsection 2037 is connected to the third subsection 2035. The fourth subsection 2037 has an initiation end 2037*a* and a termination end 2037*b*. The initiation end 2037*a* of the fourth subsection 2037 is connected to the termination end 2035*b* of the third subsection 2035. The fourth subsection 2037 may be curved. The fifth subsection 2039 is connected to the fourth subsection 2037. The fifth subsection 2039 has an initiation end 2039*a* and a termination end 2039*b*. The initiation end 2039*a* of the fifth subsection 2039 is connected to the termination end 2037*b* of the fourth subsection 2037. The termination end 2039*b* overlaps the termination end 203*b* of the fifth section 203. The fifth subsection 2039 is a termination subsection of the fifth section 203. The fifth subsection 2039 may be flat.

The sixth section 205 is connected to the fifth section 203. The sixth section 205 has a thirteenth end 205*a* and a fourteenth end 205*b*. The thirteenth end 205*a* may be an initiation end of the sixth section 205 and is connected to the twelfth end 203*b*. The fourteenth end 205*b* may be a termination end of the sixth section 205. The third surface 201*a* in the sixth section 205 may be provided with the second active material layer 213. The fourth surface 201*b* in the sixth section 205 may be not provided with the second active material layer 213. To be specific, a part of the second current collector 201, which is defined by the sixth section 205, may be a current collector of which only one surface is provided with the active material layer. The sixth section 205 may include a curved current collector and/or a flat current collector.

The sixth section 205 may include a sixth subsection 2051, a seventh subsection 2053, an eighth subsection 2055, and a ninth subsection 2057. The sixth subsection 2051, the seventh subsection 2053, the eighth subsection 2055, and the ninth subsection 2057 each may be regarded as a part of the sixth section 205. The sixth subsection 2051, the seventh subsection 2053, the eighth subsection 2055, and the ninth subsection 2057 together constitute the entire sixth section 205.

The sixth subsection 2051 may be a starting subsection of the sixth section 205. The sixth subsection 2051 is connected to the fifth subsection 2039. The sixth subsection 2051 has an initiation end 2051*a* and a termination end 2051*b*. The initiation end 2051*a* is connected to the termination end 2039*b* of the fifth subsection 2039. The fourth surface 201*b* in the sixth subsection 2051 is provided with the second insulation adhesive 215. The second insulation adhesive 215 has an initiation end 215*a* and a termination end 215*b*. The initiation end 215*a* and the termination end 215*b* overlap the initiation end 2051*a* and the termination end 2051*b* of the sixth subsection 2051 respectively. The material of the second insulation adhesive 215 may include any material applicable to an insulation adhesive in the art. The sixth subsection 2051 may be curved. The seventh subsection 2053 is connected to the sixth subsection 2051. The seventh subsection 2053 has an initiation end 2053*a* and a termination end 2053*b*. The initiation end 2053*a* of the seventh subsection 2053 is connected to the termination end 2051*b* of the sixth subsection 2051. The seventh subsection 2053 may be flat. The eighth subsection 2055 is connected to the seventh subsection 2053. The eighth subsection 2055 has an initiation end 2055*a* and a termination end 2055*b*. The initiation end 2055*a* of the eighth subsection 2055 is connected to the termination end 2053*b* of the seventh subsection 2053. The eighth subsection 2055 may be curved. The ninth subsection 2057 is connected to the eighth subsection 2055. The ninth subsection 2057 has an initiation end 2057*a* and a termination end 2057*b*. The initiation end 2057*a* of the ninth subsection 2057 is connected to the termination end 2055*b* of the eighth subsection 2055. The termination end 2057*b* overlaps the termination end 205*b* of the sixth section 205. The ninth subsection 2057 is a termination subsection of the sixth section 205. The ninth subsection 2057 may be flat.

The seventh section 207 is connected to the sixth section 205. The seventh section 207 has a fifteenth end 207*a* and a sixteenth end 207*b*. The fifteenth end 207*a* may be an initiation end of the seventh section 207 and is connected to the fourteenth end 205*b*. The sixteenth end 207*b* may be a termination end of the seventh section 207, that is, a winding termination end of the second electrode plate 200. The third surface 201*a* and the fourth surface 201*b* in the seventh section 207 may be not provided with the second active material layer 213. To be specific, a part of the second current collector 201, which is defined by the seventh section 207, may be a current collector that is not provided with an active material layer. The seventh section 207 may include a curved current collector and a flat current collector. The sixteenth end 207*b* may overlap none of the first tab 100, the second tab 200, and the fifth end 301 of the separator 300 in the thickness direction X, so as to reduce the thickness of the jelly-roll battery cell 10I.

The seventh section 207 may include a tenth subsection 2071 and an eleventh subsection 2073. The tenth subsection 2071 and the eleventh subsection 2073 each may be regarded as a part of the seventh section 207. The tenth subsection 2071 and the eleventh subsection 2073 together constitute the entire seventh section 207.

The tenth subsection 2071 may be a starting subsection of the seventh section 207. The tenth subsection 2071 has an initiation end 2071*a* and a termination end 2071*b*. The initiation end 2071*a* of the tenth subsection 2071 is connected to the termination end 2057*b* of the ninth subsection 2057. The tenth subsection 2071 may be curved. The third surface 201*a* in the tenth subsection 2071 is provided with a third insulation adhesive 217. A material of the third insulation adhesive 217 may include a material commonly used as an insulation adhesive in the art. The third insulation adhesive 217 has an initiation end 217*a* and a termination end 217*b*. The initiation end 217*a* and the termination end 217*b* overlap the initiation end 2071*a* and the termination end 2071*b* of the tenth subsection 2071 respectively. The eleventh subsection 2073 is connected to the tenth subsection 2071. The eleventh subsection 2073 has an initiation end 2073*a* and a termination end 2073*b*. The initiation end 2073*a* of the eleventh subsection 2073 is connected to the termination end 2071*b* of the eleventh subsection 2071. The eleventh subsection 2073 is a termination subsection of the seventh section 207. The eleventh subsection 2073 may be flat. The third surface 201*a* in the eleventh subsection 2073 is provided with a second tab 211. The second tab 211 has a first side 211*a* and a second side 211*b* opposite to the first side 211*a*. The first side 211*a* is on the third surface 201*a* in the eleventh subsection 2073 of the second electrode plate 200. A material of the second tab 211 may include a metal. In some embodiments, the material of the second tab 211 may include copper. In some embodiments, the material of the second tab 211 may include nickel. In some embodiments, the material of the second tab 211 may include an alloy material of nickel, silver, or copper. In some embodiments, the material of the second tab 211 may include any material applicable to a tab in the art. The second tab 211 may be connected to the third surface 201*a* in the eleventh subsection 2073 of the second current collector 201 by any appropriate means such as, but without limitation, resistance welding, ultrasonic welding, and conductive adhesive connection. The second tab 211 is disposed to the right of the first tab 111, and does not overlap the first tab 111 in the thickness direction X. The eleventh subsection 2073 may overlap no first tab 111 in the thickness direction X. The second tab 211 may be a positive tab. In other embodiments of this application, the second tab 211 may be a negative tab. The second tab 211 is disposed to the right of the first tab 111. In other embodiments of this application, the second tab 211 may be disposed to the left of the first tab 111. The second tab 211 does not overlap the first end 103*a* of the first electrode plate 100 or the first tab 111 in the thickness direction X, so as to further reduce the thickness of the jelly-roll battery cell 10I.

The separator 300 may be disposed between the first electrode plate 100 and the second electrode plate 200. The separator 300 has a fifth end 301 and a sixth end 303. The fifth end 301 is a winding initiation end of the separator 300. The sixth end 303 is a winding termination end of the separator 300. The fifth end 301 overlaps the first tab 100 in the thickness direction X. In other embodiments of this application, the fifth end 301 does not overlap the first tab 100 in the thickness direction X, so as to further reduce the thickness of the jelly-roll battery cell 10I. The sixth end 303 of the separator 300 does not overlap the first tab 111 or the second tab 211 in the thickness direction X. The separator 300 may have a virtual first boundary line 305. A part from the first boundary line 305 to the fifth end 301, which constitutes a part of the separator 300, is defined as a first part Q of the separator 300. A shape of the first part Q may be flat. The first part Q overlaps the first tab 100 in the thickness direction X. In other embodiments of this application, the first part Q may overlap no first tab 100 in the thickness direction X, so as to further reduce the thickness of the jelly-roll battery cell 10I. The separator 300 located between the second section 105 and the third section 107 may be provided with a coating to improve safety of the jelly-roll battery cell 10I. In other embodiments of this application, the separator 300 located between the second section 105 and the third section 107 may be not provided with a coating, so as to reduce the thickness of the jelly-roll battery cell 10I. A material of the separator 300 may include any material applicable to a separator in the art. The sixth end 303 of the separator 300 may be flush with the termination end 215*b* of the second insulation adhesive 215 and the termination end 217*b* of the third insulation adhesive 217. Alternatively, the sixth end 303 may extend beyond the termination end 215*b* of the second insulation adhesive 215 and the termination end 217*b* of the third insulation adhesive 217, so as to ensure safety of the jelly-roll battery cell 10I.

The jelly-roll battery cell 10I may further include a first insulation adhesive 400 overlaying the winding termination end 207*b* of the second electrode plate 200, and the second electrode plate 200 is fixed above the fourth surface 201*b* in the seventh subsection 2053 of the jelly-roll battery cell 10I. The first insulation adhesive 400 may be made of a material commonly used as an insulation adhesive in the art, for example but without limitation, insulation tape, polyolefin hot-melt adhesive, hot-melt adhesive made of ethylene and a copolymer thereof, polyurethane hot-melt adhesive, or polyamide hot-melt adhesive. The first insulation adhesive 400 may overlap neither the first tab 111 nor the second tab

211 in the thickness direction X, so as to maximize a thickness space and further increase the energy density of the jelly-roll battery cell 10I.

Both the third surface 201*a* and the fourth surface 201*b* at the winding initiation end 203*a* of the second current collector 201 are provided with the second active material layer 213. Therefore, the jelly-roll battery cell 10I according to this embodiment of this application is free from two empty coils of opposite current collectors, that is, two coils are not provided with an active material layer. In addition, by disposing the first tab 111 on the first surface 101*a* in the second section 105 of the first electrode plate 100, the first tab 111 of the jelly-roll battery cell 10I according to this embodiment of this application may overlap no first end 103*a* of the first electrode plate 100 in the thickness direction X, thereby reducing the thickness of the battery cell 10. The thickness in the thickness direction X at the position of the first tab 111 consists of thicknesses of two layers of separators 300 located in the central region S, the first tab 111, and remaining components. The thickness in the thickness direction X at the position of the second tab 211 consists of thicknesses of the second current collector 201, the second tab 211, and remaining components. Therefore, compared with a conventional jelly-roll battery cell, the jelly-roll battery cell 10I according to this embodiment of this application reduces the thickness, and thereby achieves a higher energy density and a higher space utilization rate.

Figure 1B:
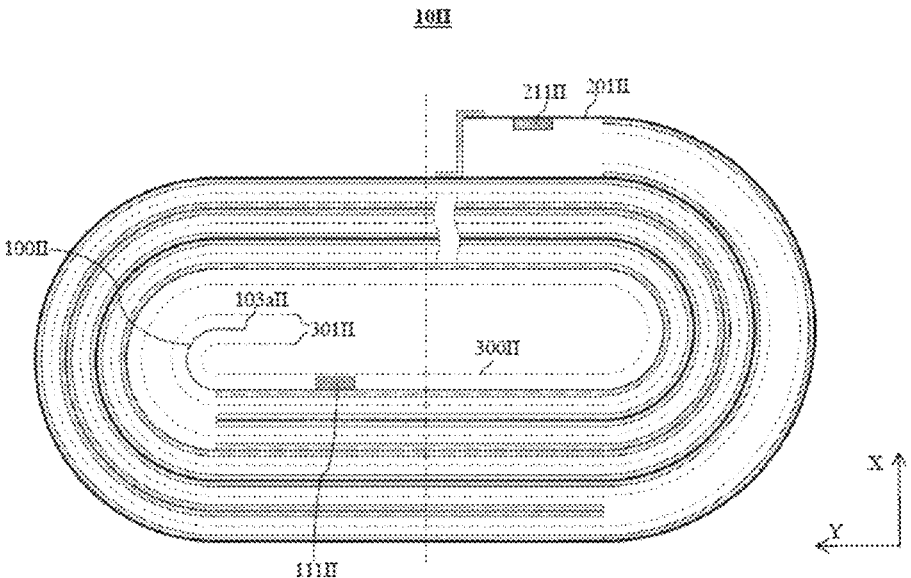
FIG. 1B is a cross-sectional schematic view of a jelly-roll battery cell according to another embodiment of this application.

FIG. 1B is a cross-sectional schematic view of a jelly-roll battery cell 10II according to another embodiment of this application. As shown in FIG. 1B, the jelly-roll battery cell 10II according to another embodiment of this application differs from the jelly-roll battery cell 10I shown in FIG. 1 only in: the fifth end 301II of the separator 300II does not overlap the first tab 111II in the thickness direction X.

The fifth end 301II of the separator 300II does not overlap the first end 103*a*II of the first electrode plate 100II, the first tab 111II, or the second tab 211II in the thickness direction X. Therefore, the thickness in the thickness direction X at the position of the first tab 111II consists of the thicknesses of the first tab 111 and remaining components. The thickness in the thickness direction X at the position of the second tab 211II consists of the thicknesses of the second current collector 201II, the second tab 211II, and remaining components. Therefore, the jelly-roll battery cell 10II according to this embodiment of this application has even a smaller thickness in the thickness direction X than the jelly-roll battery cell 10I shown in FIG. 1A, thereby achieving a higher energy density.

Figure 1C:
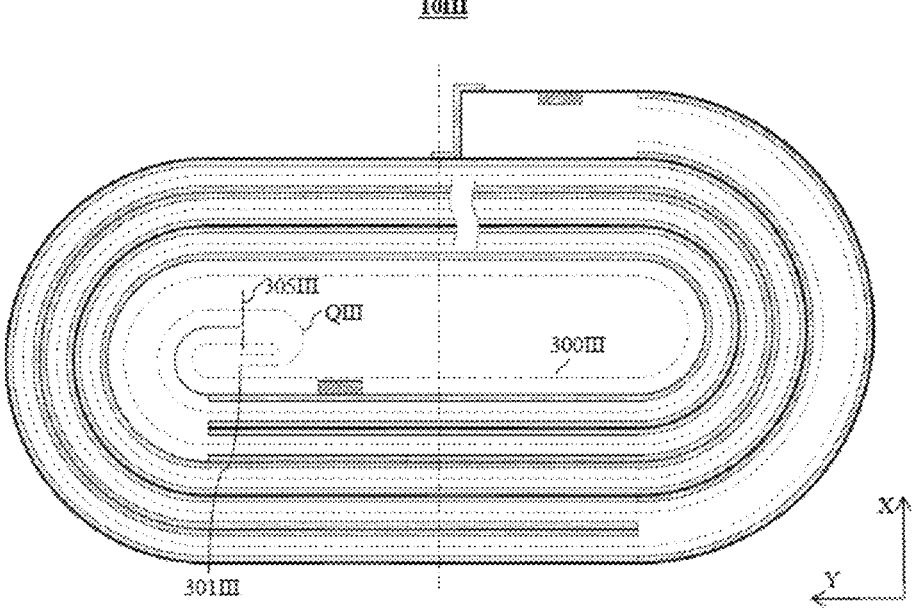
FIG. 1C is a cross-sectional schematic view of a jelly-roll battery cell according to still another embodiment of this application.

FIG. 1C is a cross-sectional schematic view of a jelly-roll battery cell 10III according to still another embodiment of this application. As shown in FIG. 1C, the jelly-roll battery cell 10III according to still another embodiment of this application differs from the jelly-roll battery cell 10II shown in FIG. 1B only in: a shape of the first part QIII defined by the first boundary line 305III of the separator 300III and the fifth end 301III of the separator 300III is curved.

Figure 1D:
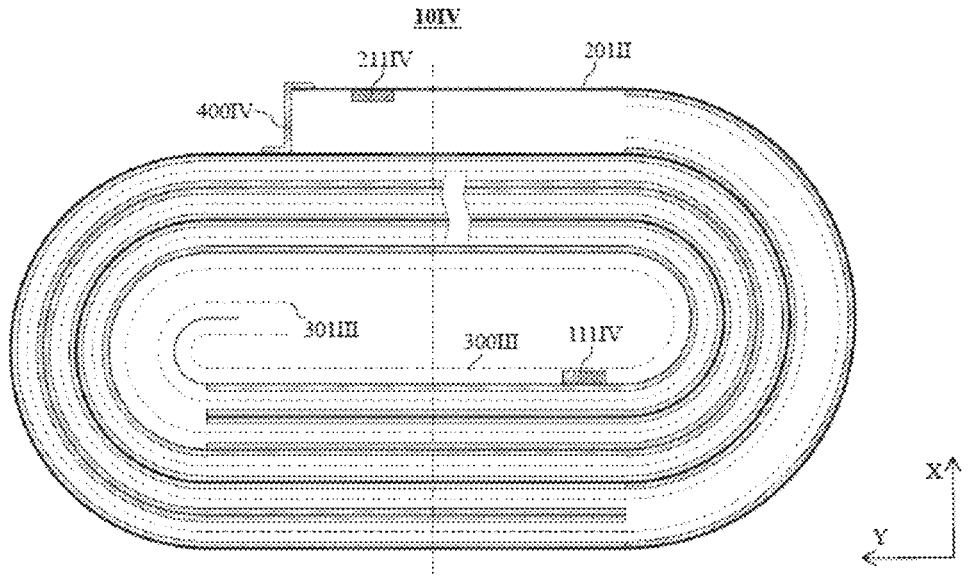
FIG. 1D is a cross-sectional schematic view of a jelly-roll battery cell according to another embodiment of this application.

FIG. 1D is a cross-sectional schematic view of a jelly-roll battery cell 10IV according to another embodiment of this application. As shown in FIG. 1D, the jelly-roll battery cell 10IV according to another embodiment of this application differs from the jelly-roll battery cell 10II shown in FIG. 1B only in: the second tab 211IV is located to the left of the first tab 111IV. The first insulation adhesive 400IV overlaps the fifth end 301IV of the separator 300IV in the thickness direction X. In other embodiments of this application, the first insulation adhesive 400IV may overlap no fifth end 301IV of the separator 300IV in the thickness direction X, so as to further reduce the thickness of the jelly-roll battery cell 10IV. The first insulation adhesive 400IV does not overlap the first end 103aIV of the first electrode plate 100IV in the thickness direction X. The thickness in the thickness direction X at the position of the first tab 111IV consists of the thicknesses of the first tab 111IV, the second current collector 201IV, and remaining components. The thickness in the thickness direction X at the position of the second tab 211IV consists of the thicknesses of the second current collector 201IV, the second tab 211IV, and remaining components.

Figure 1E:
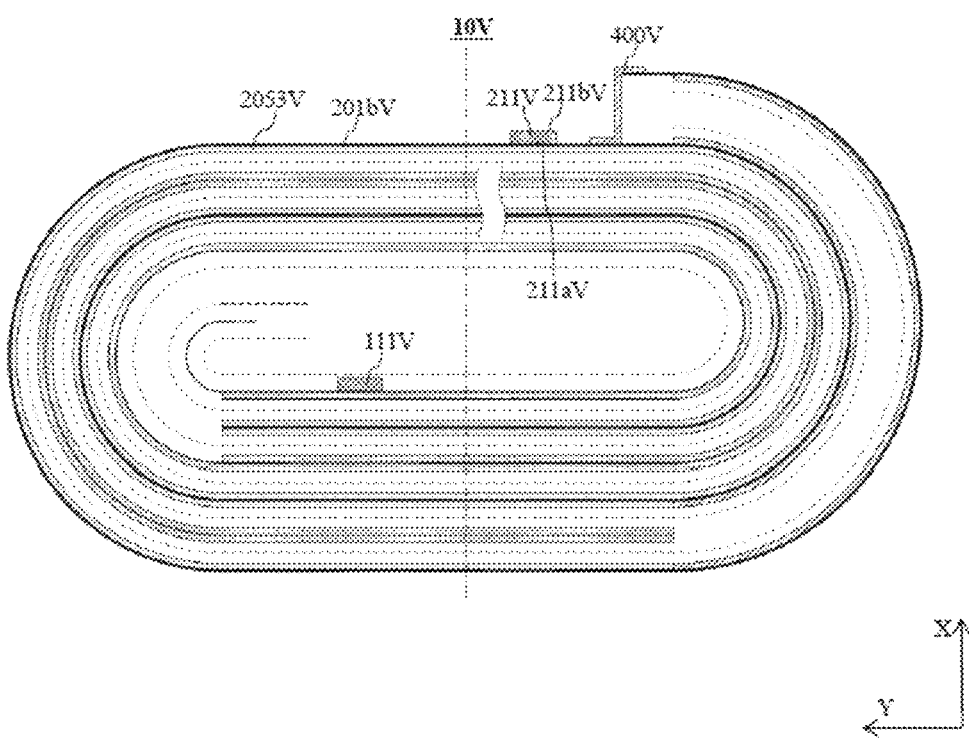
FIG. 1E is a cross-sectional schematic view of a jelly-roll battery cell according to still another embodiment of this application.

FIG. 1E is a cross-sectional schematic view of a jelly-roll battery cell 10V according to still another embodiment of this application. As shown in FIG. 1E, the jelly-roll battery cell 10V according to still another embodiment of this application differs from the jelly-roll battery cell 10II shown in FIG. 1B only in: the first side 211aV of the second tab 211V is disposed on the fourth surface 201bV in the seventh subsection 2053V. The thickness in the thickness direction X at the position of the first tab 111V consists of the thicknesses of the first tab 111V and remaining components. The thickness in the thickness direction X at the position of the second tab 211IV consists of the thicknesses of the second tab 211IV and remaining components. Therefore, the jelly-roll battery cell 10V according to this embodiment of this application has even a smaller thickness in the thickness direction X than the jelly-roll battery cells shown in FIG. 1A to FIG. 1D, thereby achieving a higher energy density.

In other embodiments of this application, the jelly-roll battery cell 10V may further include a fourth insulation adhesive (not shown in the drawing) overlaying the second side 211bV of the second tab 211V, so as to prevent the second tab 211V from piercing a package of the jelly-roll battery cell 10V and avoid corrosion.

Figure 1F:
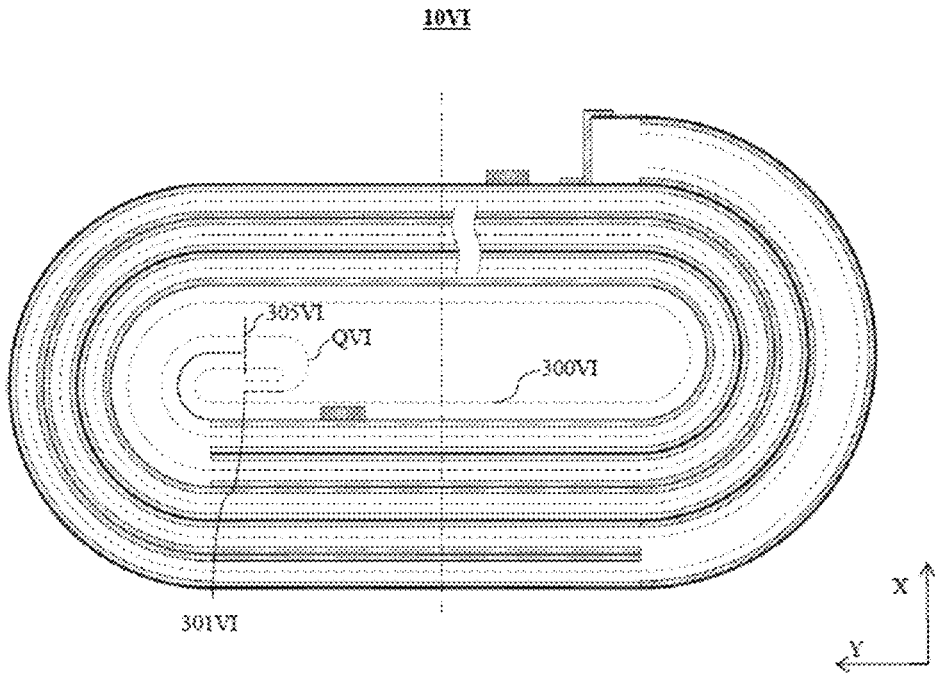
FIG. 1F is a cross-sectional schematic view of a jelly-roll battery cell according to another embodiment of this application.

FIG. 1F is a cross-sectional schematic view of a jelly-roll battery cell 10VI according to another embodiment of this application. As shown in FIG. 1F, the jelly-roll battery cell 10IV according to another embodiment of this application differs from the jelly-roll battery cell 10V shown in FIG. 1E only in: a shape of the first part QVI defined by the first boundary line 305VI of the separator 300VI and the fifth end 301VI of the separator 300VI is curved.

Figure 1G:
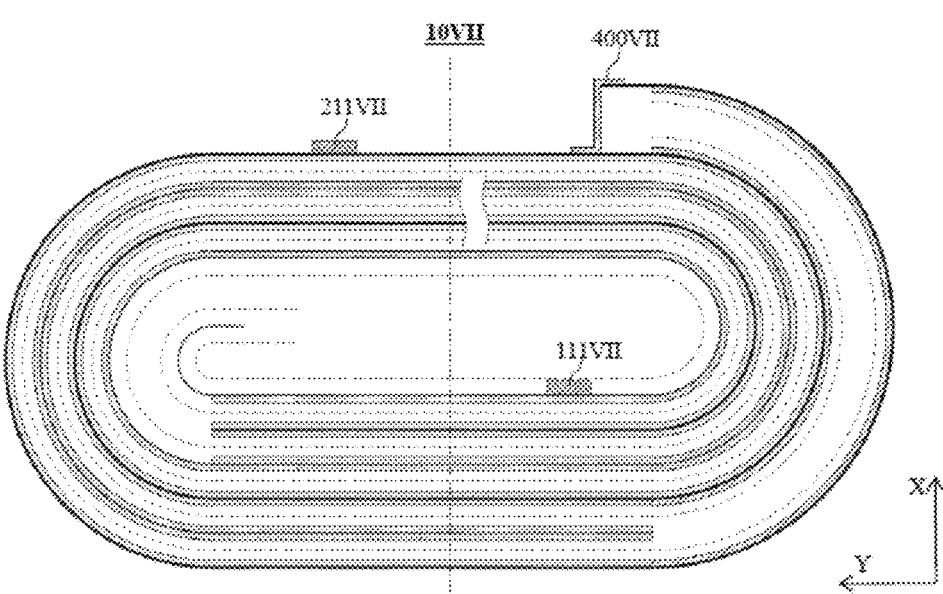
FIG. 1G is a cross-sectional schematic view of a jelly-roll battery cell according to still another embodiment of this application.

FIG. 1G is a cross-sectional schematic view of a jelly-roll battery cell 10VII according to still another embodiment of this application. As shown in FIG. 1G, the jelly-roll battery cell 10VII according to still another embodiment of this application differs from the jelly-roll battery cell 10V shown in FIG. 1E only in: the second tab 211VII is located to the left of the first tab 111IVII, and the first insulation adhesive 400VII overlaps the first tab 111VII in the thickness direction X. The thickness in the thickness direction X at the position of the first tab 111VII consists of the thicknesses of the first tab 111VII, the first insulation adhesive 400VII, and remaining components. The thickness in the thickness direction X at the position of the second tab 211VII consists of the thicknesses of the second tab 211VII and remaining components.

In other embodiments of this application, the first insulation adhesive 400VII may overlap no first tab 111VII in the thickness direction X. The thickness in the thickness direction X at the position of the first tab 111VII consists of the thicknesses of the first tab 111VII and remaining components. The thickness in the thickness direction X at the position of the second tab 211VII consists of the thicknesses of the second tab 211VII and remaining components.

Figure 1H:
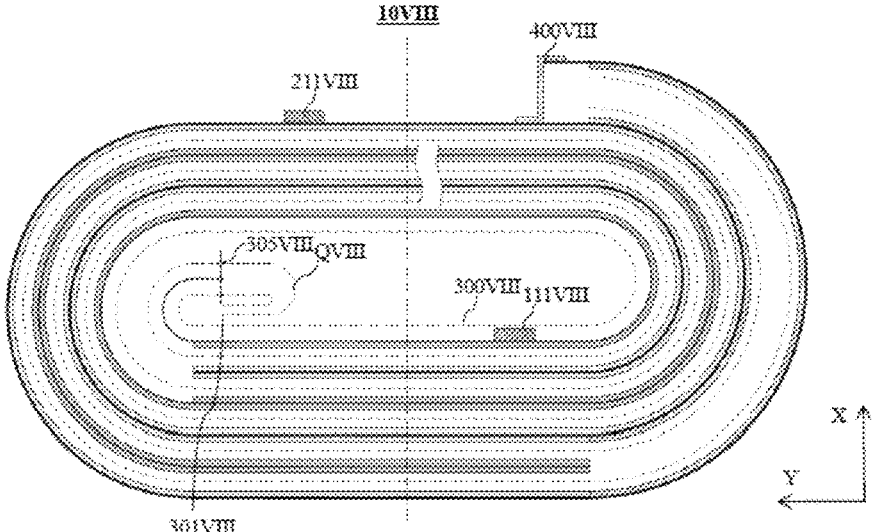
FIG. 1H is a cross-sectional schematic view of a jelly-roll battery cell according to another embodiment of this application.

FIG. 1H is a cross-sectional schematic view of a jelly-roll battery cell 10VIII according to another embodiment of this application. As shown in FIG. 1H, the jelly-roll battery cell 10VIII according to another embodiment of this application differs from the jelly-roll battery cell 10VII shown in FIG. 1G only in: a shape of the first part QVIII defined by the first boundary line 305VIII of the separator 300VIII and the fifth end 301VIII of the separator 300VIII is curved. The first part QVIII partially overlaps the second tab 211VIII in the thickness direction X. The thickness in the thickness direction X at the position of the first tab 111VIII consists of the thicknesses of the first tab 111VIII, the first insulation adhesive 400VIII, and remaining components. The thickness in the thickness direction X at the position of the second tab 211VIII consists of the thicknesses of the second tab 211VIII, two layers of separators 300, and remaining components.

In other embodiments of this application, the first insulation adhesive 400VIII may overlap no first tab 111VIII in the thickness direction X, and the first part QVIII may overlap no second tab 211VIII in the thickness direction X. The thickness in the thickness direction X at the position of the first tab 111VIII consists of the thicknesses of the first tab 111VIII and remaining components. The thickness in the thickness direction X at the position of the second tab 211VIII consists of the thicknesses of the second tab 211VIII and remaining components.

Figure 1I:
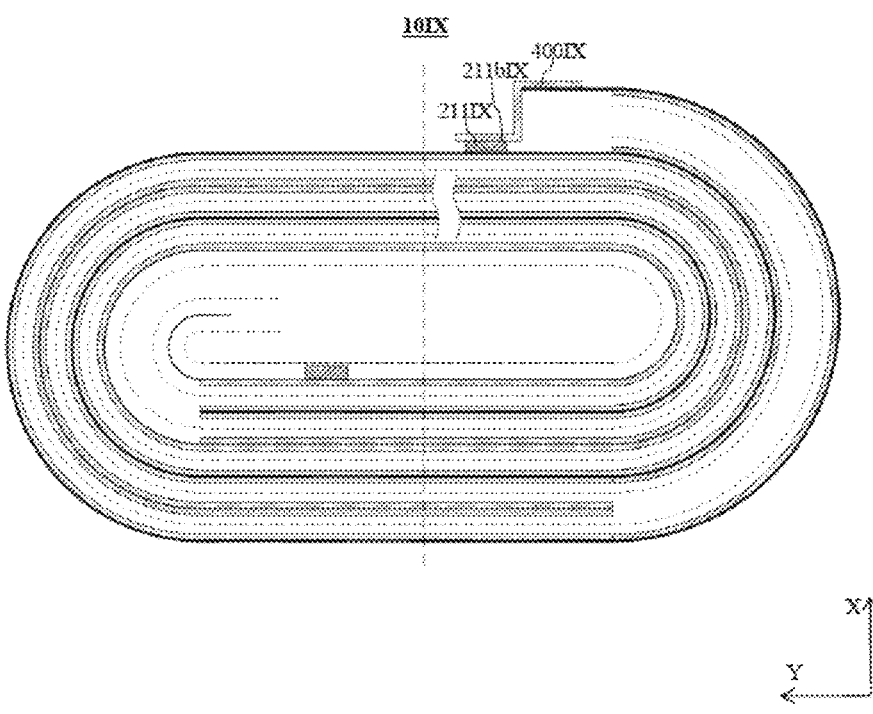
FIG. 1I is a cross-sectional schematic view of a jelly-roll battery cell according to still another embodiment of this application.

FIG. 1I is a cross-sectional schematic view of a jelly-roll battery cell 10IX according to still another embodiment of this application. As shown in FIG. 1I, the jelly-roll battery cell 10IX according to still another embodiment of this application differs from the jelly-roll battery cell 10V shown in FIG. 1E only in: the first insulation adhesive 400IX overlays the second side 211bIX of the second tab 211IX, so as to prevent the second tab 211IX from piercing the package of the jelly-roll battery cell 10IX and avoid corrosion.

Figure 1J:
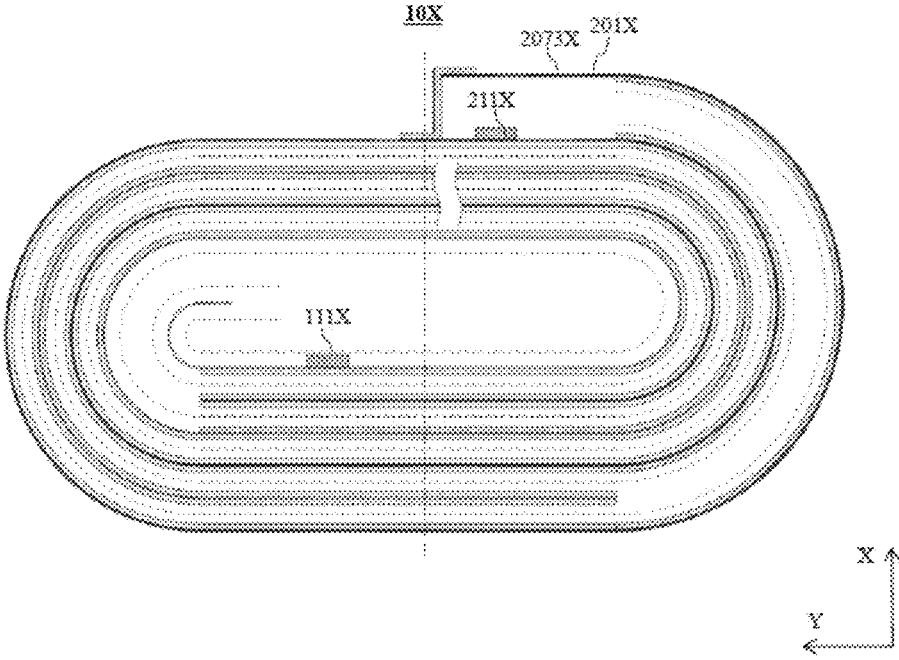
FIG. 1J is a cross-sectional schematic view of a jelly-roll battery cell according to another embodiment of this application.

FIG. 1J is a cross-sectional schematic view of a jelly-roll battery cell 10X according to another embodiment of this application. As shown in FIG. 1J, the jelly-roll battery cell 10X according to another embodiment of this application differs from the jelly-roll battery cell 10V shown in FIG. 1E only in: the second tab 211X is located below the eleventh subsection 2073X. The thickness in the thickness direction X at the position of the first tab 111X consists of the thicknesses of the first tab 111X and remaining components. The thickness in the thickness direction X at the position of the second tab 211X consists of the thicknesses of the second tab 211X, the second current collector 201X, and remaining components.

Figure 1K:
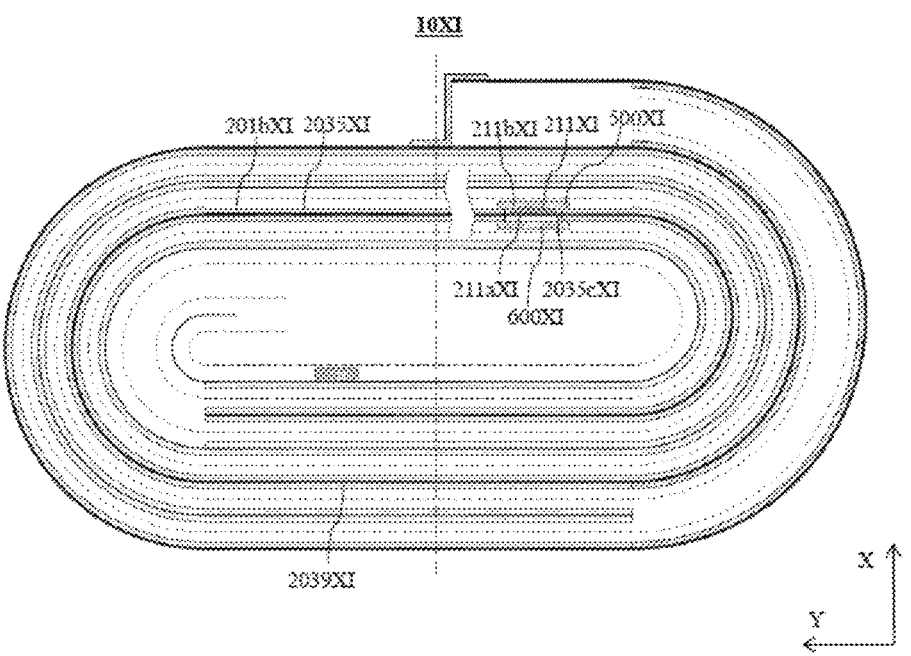
FIG. 1K is a cross-sectional schematic view of a jelly-roll battery cell according to still another embodiment of this application.

FIG. 1K is a cross-sectional schematic view of a jelly-roll battery cell 10XI according to still another embodiment of this application. As shown in FIG. 1K, the jelly-roll battery cell 10XI according to still another embodiment of this application differs from the jelly-roll battery cell 10X shown in FIG. 1J in: the first side 211aXI of the second tab 211XI is located on the fourth surface 201bXI in the first part 2035cXI of the third subsection 2035XI. Neither the third surface 201aXI nor the fourth surface 201bXI in the first part 2035cXI is provided with the first or second active material layer. The jelly-roll battery cell 10XI further includes a fifth insulation adhesive 500XI that is disposed on a second side 211bXI of the second tab 211XI and that shields a surface in the first part 2035cXI, where the surface is connected to the first side 211aXI of the second tab 211XI, so as to prevent welding burrs of the second tab 211XI from piercing the separator 300 and bringing risks of short circuits. The jelly-roll battery cell 10XI may further include a sixth insulation adhesive 600XII that is opposite to the fifth insulation adhesive 500XII and that shields a surface in the first part, where the surface is not connected to the first side 211*a*XI of the second tab 211XI, so as to prevent the welding burrs of the second tab 211XI from piercing the separator 300XI and bringing risks of short circuits. Materials of the fifth insulation adhesive 500XI and the sixth insulation adhesive 600XI may include a material that is commonly used as an insulation adhesive in the art.

In other embodiments of this application, the first side 211*a*XI of the second tab 211XI may be located on the fourth surface 201*b*XI in the second part of the fifth subsection 2039XI. The second part in the fifth subsection 2039XI is similar to the first part 2035*c*XI, and neither the third surface 201*a*XI nor the fourth surface 201*b*XI in the second part is provided with an active material layer. In addition, the fifth insulation adhesive 500XI is disposed on the second side 211*b*XI of the second tab 211XI and shields a surface in the second part, where the surface is connected to the second side 211*b*XI of the second tab 211XI. The sixth insulation adhesive 600XI is opposite to the fifth insulation adhesive 500XI and shields a surface in the second part, where the surface is not connected to the first side 211*a*XI of the second tab 211XI.

Figure 1L:
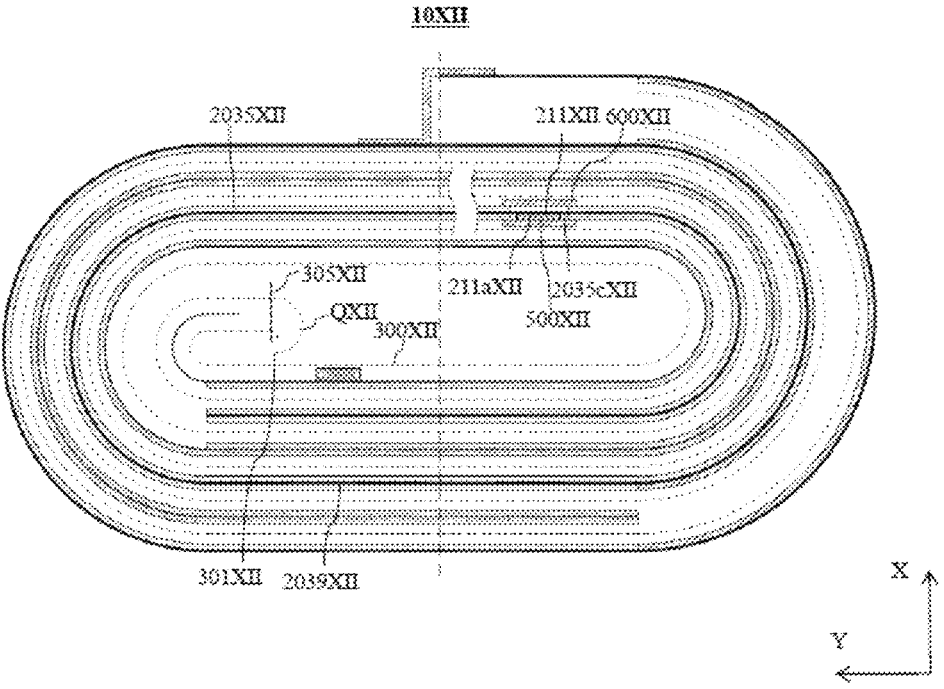
FIG. 1L is a cross-sectional schematic view of a jelly-roll battery cell according to another embodiment of this application.

FIG. 1L is a cross-sectional schematic view of a jelly-roll battery cell 10XII according to another embodiment of this application. As shown in FIG. 1L, the jelly-roll battery cell 10XII according to another embodiment of this application differs from the jelly-roll battery cell 10XI shown in FIG. 1K in: the first side 211*a*XII of the second tab 211XII is located on the third surface 201*a*XII in the first part 2035*c*XII of the third subsection 2035XII. Neither the third surface 201*a*XII nor the fourth surface 201*b*XII in the first part 2035*c*XII is provided with an active material layer. The jelly-roll battery cell 10XII further includes a fifth insulation adhesive 500XII that is disposed on the second side 211*b*XII of the second tab 211XII and that shields a surface in the first part 2035*c*XII, where the surface is connected to the second side 211*b*XII of the second tab 211XII. The jelly-roll battery cell 10XII may further include a sixth insulation adhesive 600XII that is opposite to the fifth insulation adhesive 500XII and disposed on a surface in the first part 2035*c*XII, where the surface is not connected to the first side 211*a*XII of the second tab 211XII. A shape of the first part QXII defined by the first boundary line 305XII of the separator 300XII and the fifth end 301XII of the separator 300XII is curved.

In other embodiments of this application, the first side 211*a*XII of the second tab 211XII may be located on the third surface 201*a*XII in the second part of the fifth subsection 2039XII. The second part in the fifth subsection 2039XII is similar to the first part 2035Cxii. Neither the third surface 201*a*XII nor the fourth surface 201*b*XII in the second part is provided with an active material layer. The fifth insulation adhesive 500XII is disposed on the second side 211*b*XII of the second tab 211XII and shields a surface in the second part, where the surface is connected to the second side 211*b*XII of the second tab 211XII. The sixth insulation adhesive 600XII is opposite to the fifth insulation adhesive 500XII and shields a surface in the second part, where the surface is not connected to the first side 211*a*XII of the second tab 211XII, so as to prevent the welding burrs of the second tab 211XII from piercing the separator 300XII and bringing risks of short circuits.

Figure 1M:
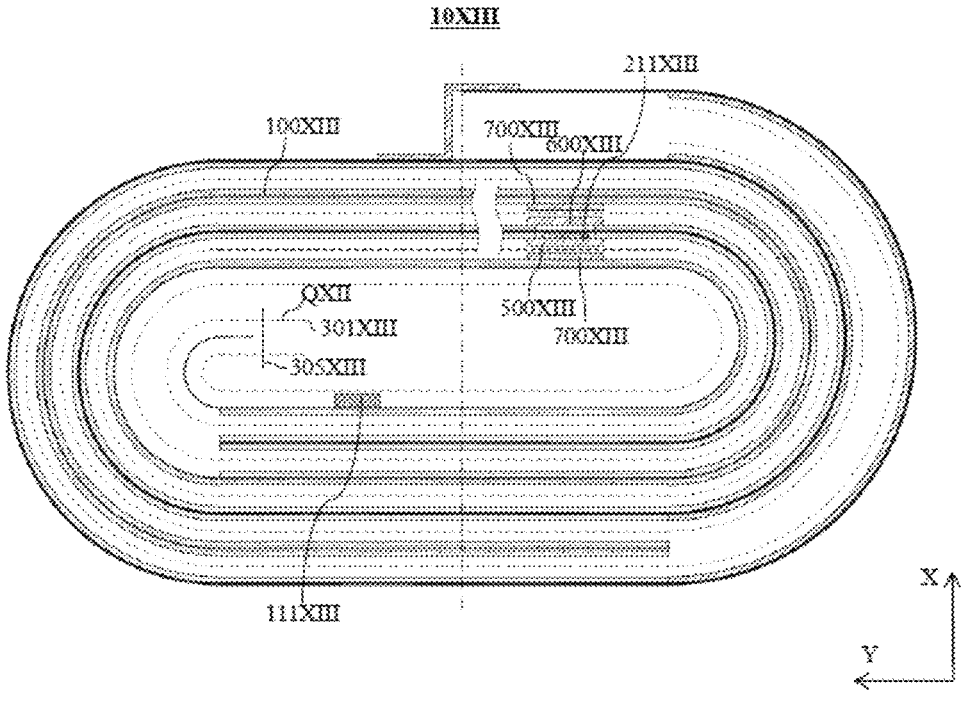
FIG. 1M is a cross-sectional schematic view of a jelly-roll battery cell according to still another embodiment of this application.

FIG. 1M is a cross-sectional schematic view of a jelly-roll battery cell 10XIII according to still another embodiment of this application. As shown in FIG. 1M, the jelly-roll battery cell 10XIII according to still another embodiment of this application differs from the jelly-roll battery cell 10XII shown in FIG. 1L in: the jelly-roll battery cell 10XIII further includes a seventh insulation layer 700XIII disposed at a corresponding position on the first electrode plate 111XIII, where the position is opposite to the fifth insulation adhesive 500XIII and the sixth insulation adhesive 600XIII. The fifth insulation adhesive 500XIII and the sixth insulation adhesive 600XIII can further prevent the welding burrs of the second tab 211XIII from piercing the separator and bringing risks of short circuits, so as to further improve safety performance. The thickness of the fifth insulation adhesive 500XIII, the sixth insulation adhesive, and the seventh insulation layer 700XIII in the thickness direction X may be smaller than the thickness of the tab. A material of the seventh insulation layer 700XIII may include a material that is commonly used as an insulation adhesive in the art. A shape of the first part QXIII defined by the first boundary line 305XIII of the separator 300XIII and the fifth end 301XIII of the separator 300XIII is flat.

Figure 1N:
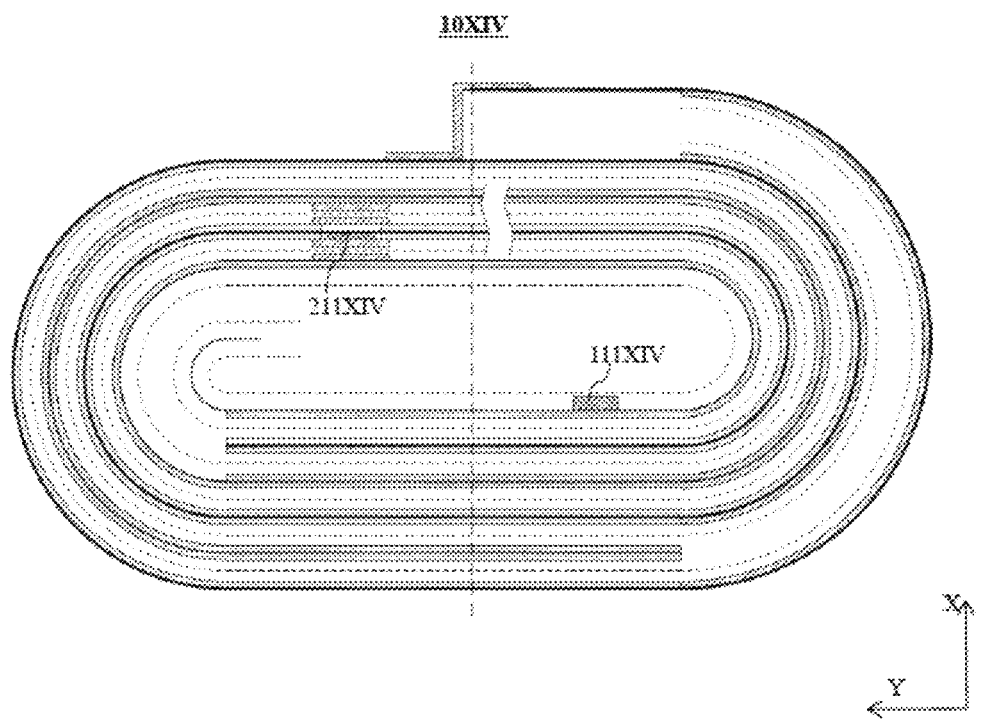
FIG. 1N is a cross-sectional schematic view of a jelly-roll battery cell according to another embodiment of this application.

FIG. 1N is a cross-sectional schematic view of a jelly-roll battery cell 10XIV according to another embodiment of this application. As shown in FIG. 1N, the jelly-roll battery cell 10XIV according to another embodiment of this application differs from the jelly-roll battery cell 10XIII shown in FIG. 1M only in: the second tab 211XIV is located to the left of the first tab 111XIV.

An embodiment of this application further provides an electrochemical device, including the jelly-roll battery cell according to any embodiment of this application.

The technical content and technical features of this application have been disclosed above, but a person skilled in the art may still make various substitutions and modifications based on the teachings and disclosure of this application without departing from the spirit of this application. Therefore, the protection scope of this application is not limited to the content disclosed in the embodiments, but includes various substitutions and modifications made without departing from this application, and is covered by the claims of this application.

What is claimed is:

1. A jelly-roll battery cell, comprising:
   a first electrode plate, a second electrode plate, and a separator; wherein the separator is disposed between the first electrode plate and the second electrode plate; the first electrode plate, the second electrode plate, and the separator are wound to form the jelly-roll battery cell; and the jelly-roll battery cell has a thickness direction and a winding center that is enclosed by the first electrode plate, the second electrode plate, and the separator;
   the first electrode plate comprises a first current collector, wherein the first current collector comprises a first surface and a second surface opposite to the first surface, the first surface facing the winding center and the second surface facing away from the winding center;
   the first current collector comprises a first section and a second section;
   wherein the first section has a first end and a second end, and the first end is a winding initiation end of the first electrode plate;
   the second section has a third end and a fourth end, the third end is connected to the second end, the second section is flat, and a first tab is disposed on the first surface in the second section;

the second electrode plate comprises a second tab, wherein the second tab has a first side and a second side opposite to the first side, and the first side is on the second electrode plate;

wherein the first end, the first tab, and the second tab do not overlap in the thickness direction.

2. The jelly-roll battery cell according to claim 1, wherein the separator has a fifth end and a sixth end; the fifth end is a winding initiation end of the separator; the sixth end is a winding termination end of the separator; and the fifth end does not overlap the first end, the first tab, or the second tab in the thickness direction.

3. The jelly-roll battery cell according to claim 2, wherein the sixth end does not overlap the first tab or the second tab in the thickness direction.

4. The jelly-roll battery cell according to claim 2, wherein the separator has a first boundary line, a part from the first boundary line to the fifth end constitutes a first part of the separator, a shape of the first part is curved or flat, and the first part does not overlap the first tab or the second tab in the thickness direction.

5. The jelly-roll battery cell according to claim 1, further comprising a first insulation adhesive, wherein the first insulation adhesive overlays a winding termination end of the second electrode plate, and the first insulation adhesive does not overlap the first tab or the second tab in the thickness direction.

6. The jelly-roll battery cell according to claim 1, wherein a winding termination end of the second electrode plate does not overlap the first tab or the second tab in the thickness direction.

7. The jelly-roll battery cell according to claim 1, wherein no first active material layer is disposed on the first surface or the second surface in the first section, no first active material layer is disposed on the first surface in the second section, and the first active material layer is disposed on the second surface in the second section.

8. The jelly-roll battery cell according to claim 1, wherein the first current collector further comprises a third section and a fourth section; wherein the third section has a seventh end and an eighth end, and the seventh end is connected to the fourth end;

the fourth section has a ninth end and a tenth end, the ninth end is connected to the eighth end, and the tenth end is a winding termination end of the first electrode plate; and no first active material layer is disposed on the first surface in the third section, the first active material layer is disposed on the second surface in the third section, and the first active material layer is disposed on the first surface and the second surface in the fourth section.

9. The jelly-roll battery cell according to claim 8, wherein the separator located between the second section and the third section is provided with a coating or not provided with a coating.

10. The jelly-roll battery cell according to claim 2, wherein the second electrode plate comprises a second current collector, the second current collector comprises a third surface and a fourth surface opposite to the third surface, the third surface is closer to the central region than the fourth surface; and the second current collector further comprises:

a fifth section, a sixth section, and a seventh section, wherein the fifth section has an eleventh end and a twelfth end, and the eleventh end is a winding initiation end of the second electrode plate;

the sixth section has a thirteenth end and a fourteenth end, and the thirteenth end is connected to the twelfth end;

the seventh section has a fifteenth end and a sixteenth end, the fifteenth end is connected to the fourteenth end, and the sixteenth end is a winding termination end of the second electrode plate; and a second active material layer is disposed on the third surface and the fourth surface in the fifth section, the second active material layer is disposed on the third surface in the sixth section, no second active material layer is disposed on the third surface or the fourth surface in the seventh section.

11. The jelly-roll battery cell according to claim 10, wherein the fifth section comprises a first subsection, a second subsection, a third subsection, a fourth subsection, and a fifth subsection; the first subsection, the third subsection, and the fifth subsection are flat; the second subsection and the fourth subsection are curved; the first subsection is a starting subsection of the fifth section; the second subsection is connected to the first subsection; the third subsection is connected to the second subsection; the fourth subsection is connected to the third subsection; and the fifth subsection is an ending subsection of the fifth section;

the sixth section comprises a sixth subsection, a seventh subsection, an eighth subsection, and a ninth subsection; the sixth subsection and the eighth subsection are curved; the seventh subsection and the ninth subsection are flat; the sixth subsection is a starting subsection of the sixth section; the seventh subsection is connected to the sixth subsection; the eighth subsection is connected to the seventh subsection; the ninth subsection is connected to the eighth subsection; and the ninth subsection is an ending subsection of the sixth section;

the seventh section comprises a tenth subsection and an eleventh subsection, the tenth subsection is curved, the eleventh subsection is flat, and the tenth subsection is a starting subsection of the seventh section, and the eleventh subsection is an ending subsection of the seventh section; and a second insulation adhesive is disposed on the fourth surface in the sixth subsection, an initiation end and a termination end of the second insulation adhesive overlap an initiation end and a termination end of the sixth subsection respectively, and the initiation end of the sixth subsection is connected to the fifth section; and, a third insulation adhesive is disposed on the third surface in the tenth subsection, an initiation end and a termination end of the third insulation adhesive overlap an initiation end and a termination end of the tenth subsection respectively, and the initiation end of the tenth subsection is connected to the sixth section.

12. The jelly-roll battery cell according to claim 11, wherein the sixth end extends beyond the termination ends of the second insulation adhesive and the third insulation adhesive, or the sixth end is flush with the termination ends of the second insulation adhesive and the third insulation adhesive.

13. The jelly-roll battery cell according to claim 11, wherein the first side of the second tab is on the third surface in the eleventh subsection.

14. The jelly-roll battery cell according to claim 11, wherein the first side of the second tab is on the fourth surface in the seventh subsection.

15. The jelly-roll battery cell according to claim 14, further comprising a fourth insulation adhesive overlaying the second side of the second tab.

16. The jelly-roll battery cell according to claim 14, wherein a first insulation adhesive overlays the second side of the second tab.

17. The jelly-roll battery cell according to claim 14, wherein the second tab is located below the eleventh subsection.

18. The jelly-roll battery cell according to claim 11, wherein the third subsection has a first part, no second active material layer is disposed on the third surface or the fourth surface in the first part, and the first side of the second tab is on either the third surface or the fourth surface in the first part; or, the fifth subsection has a second part, no second active material layer is disposed on the third surface or the fourth surface in the second part, and the first side of the second tab is on either the third surface or the fourth surface in the second part; and the jelly-roll battery cell further comprises:

a fifth insulation adhesive, disposed on the second side of the second tab, and shielding a corresponding surface in the first part or the second part, wherein the surface is connected to the second side of the second tab; and a sixth insulation adhesive, disposed opposite to the fifth insulation adhesive, and shielding a surface in the first part or a surface in the second part, in each case the surface being not connected to the first side of the second tab.

19. The jelly-roll battery cell according to claim 18, further comprising a seventh insulation layer disposed at a corresponding position on the first electrode plate, the position being opposite to the fifth insulation adhesive and the sixth insulation adhesive.

20. An electrochemical device, comprising a jelly-roll battery cell, the jelly-roll battery cell comprising:

a first electrode plate, a second electrode plate, and a separator; wherein the separator is disposed between the first electrode plate and the second electrode plate; the first electrode plate, the second electrode plate, and the separator are wound to form the jelly-roll battery cell; and the jelly-roll battery cell has a thickness direction and a winding center that is enclosed by the first electrode plate, the second electrode plate, and the separator;

the first electrode plate comprises a first current collector, wherein the first current collector comprises a first surface and a second surface opposite to the first surface, the first surface facing the winding center and the second surface facing away from the winding center;

the first current collector comprises a first section and a second section;

wherein the first section has a first end and a second end, and the first end is a winding initiation end of the first electrode plate;

the second section has a third end and a fourth end, the third end is connected to the second end, the second section is flat, and a first tab is disposed on the first surface in the second section;

the second electrode plate comprises a second tab, wherein the second tab has a first side and a second side opposite to the first side, and the first side is on the second electrode plate;

wherein the first end, the first tab, and the second tab do not overlap in the thickness direction.

* * * * *